Patented May 5, 1936

2,040,040

UNITED STATES PATENT OFFICE

2,040,040

MORPHOLINO-METHO POLYHYDRIC PHENOLS

Herman A. Bruson, Elkins Park, Pa., assignor to Röhm & Haas Company, Philadelphia, Pa.

No Drawing. Application June 27, 1935, Serial No. 28,611

7 Claims. (Cl. 260—28)

This invention relates to new phenols, more particularly to polyhydric phenols which contain one or more morpholino-metho groups as nuclear substituents. The term "morpholino-metho", as used herein, refers to the group having the following structure:

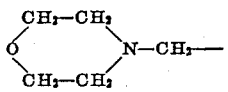

The present application is a continuation in part of my co-pending application Serial No. 8,301, filed February 26, 1935.

The morpholinometho-polyhydric phenols are obtained according to the present invention, by condensing a nuclear polyhydroxy aromatic compound hereinafter referred to as a polyhydric phenol, which possesses at least one readily replaceable nuclear hydrogen atom, with at least one molecular equivalent each of morpholine and formaldehyde.

Polyhydric phenols which possess more than one readily replaceable nuclear hydrogen atom, such as the dihydroxybenzenes or trihydroxybenzenes for example, can take up two molecular equivalents each of formaldehyde and morpholine, whereby two morpholino-metho groups are introduced into the benzene ring. It is believed that the morpholino-metho group enters the more reactive ortho positions of the polyhydric phenols used.

Any nuclearly polyhydroxylated aromatic compound having phenolic properties and a readily replaceable nuclear hydrogen atom can be used, provided it contains no free acidic groups. Acidic groups such as carboxyl or sulfonic acid groups must first be neutralized with a base. The polyhydric phenol used may contain, in addition, other nuclear substituents which do not interfere with the reaction namely, halogen atoms, alkyl, aryl, aralkyl, acyl, alkoxy, alkylol, nitro or acylamino groups.

The term "polyhydric phenol" includes also polyhydric polynuclear aromatic compounds such as, for example, polyhydroxy-naphthalene, polyhydroxy-anthracene, polyhydroxy-phenanthrene and their homologues.

Typical common polyhydric phenols which react readily to give almost quantitative yields of the new compounds are pyrocatechol, resorcinol, hydroquinone, pyrogallol and 1,5-dihydroxy-naphthalene. Other polyhydric phenols which can be used include n-hexylresorcinol, benzylresorcinol, α,α,γ,γ-tetramethylbutyl resorcinol, nitroresorcinol, chlorohydroquinone, α,α,γ,γ-tetramethylbutyl pyrocatechol and benzoylresorcinol. The condensations can be carried out with or without a solvent, depending upon the solubility of the polyhydric phenol used, in the morpholine and formaldehyde. Preferably, however, alcohol is used as a solvent for the reaction mixture. The formaldehyde can be gaseous, aqueous or para-formaldehyde. The morpholine and the formaldehyde may first be reacted together to yield hydroxy-methylmorpholine which can then be condensed with the polyhydric phenol; or the polyhydric phenol may be admixed with either the formaldehyde or the morpholine and the remaining component added to the mixture. Preferably, however, the morpholine is mixed with the polyhydric phenol and the formaldehyde subsequently added to the cooled, well-stirred mixture. The reaction product usually separates on standing as a crystalline mass or as a heavy oil which often crystallizes on cooling.

The new morpholinometho-polyhydric phenols are useful as ingredients of bactericidal and insecticidal compositions, as fungicides, anti-oxidants and dyestuff intermediates. They combine with alkyl halides or alkyl sulfates to give quaternary ammonium salts which are useful as soaps, wetting and emulsifying agents. They also combine with organic or inorganic acids, such as lactic, acetic, oleic, phosphoric, hydrochloric, to give salts some of which are soluble in water and can be used as disinfectants. They combine likewise with caustic alkalies to give salts.

In order to illustrate this invention, the following examples are given, but they are not intended as limitations with respect to the polyhydric phenols used, time, temperature and other conditions of condensation since the invention may otherwise be practiced within the scope of the appended claims.

EXAMPLE 1

*Bis-(morpholinometho)-resorcinol*

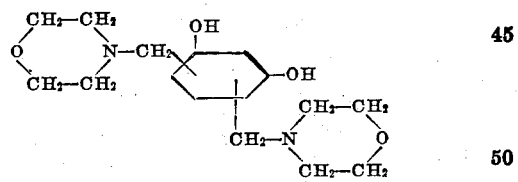

To a solution of 11 grams of resorcinol (0.1 mol.) in 30 cc. of methanol and 17.4 grams of pure morpholine (0.2 mol.) there was added gradually while stirring 20 grams of aqueous 30% formaldehyde solution (0.2 mol.). The temperature was kept between 25° and 40° C. during this addition by cooling with tap water. After standing for about six hours in a stoppered flask (to prevent oxidation) the solution solidified to a crystalline mass. The crystal cake was filtered off, and washed with a little methanol. It may be purified by recrystallization from methanol. The pure product formed colorless crystals melting at 207° C.

EXAMPLE 2

*Bis-(morpholinometho)-pyrocatechol*

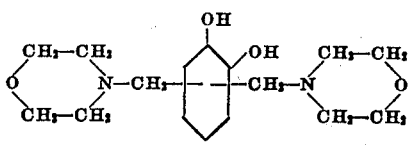

To a solution of 11 grams of pyrocatechol (0.1 mol.) in 30 cc. of methanol and 17.4 grams of morpholine (0.2 mol.) there was added, while cooling and stirring, 20 grams of aqueous 30% formaldehyde solution. Upon standing for 24-48 hours, or upon seeding the solution with a crystal of the product obtained by evaporation of the solvent from some of the solution, the mixture solidified to a crystalline mass. Upon recrystallization from ethyl alcohol the pure product formed colorless crystals melting at 176° C.

EXAMPLE 3

*Bis-(morpholinometho)-hydroquinone*

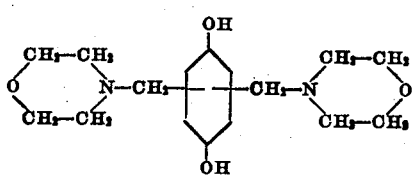

To a solution of 11 grams of hydroquinone (0.1 mol.) in 30 cc. of methanol and 17.4 grams of morpholine (0.2 mol.) there was added 20 grams of aqueous 30% formaldehyde solution, while cooling and stirring. After standing for 24 hours in a stoppered flask, the crystalline mass was filtered off. It was recrystallized from ethyl alcohol from which it separates in colorless, fine needles melting at 205° C.

EXAMPLE 4

*Bis-(morpholinometho)-pyrogallol*

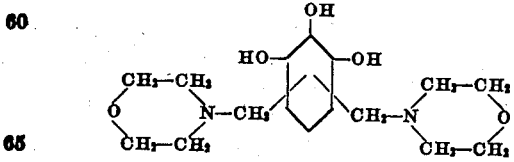

To a solution of 12.6 grams of pyrogallol (0.1 mol.) in 30 cc. of methanol and 17.4 grams of morpholine (0.2 mol.) there was added 20 grams of aqueous 30% formaldehyde solution, while stirring and cooling. In about one-half hour the solution solidified to a crystalline mass. The yield was almost quantitative. Upon recrystallization from alcohol, the pure product separated in colorless needles melting at 174°–175° C.

EXAMPLE 5

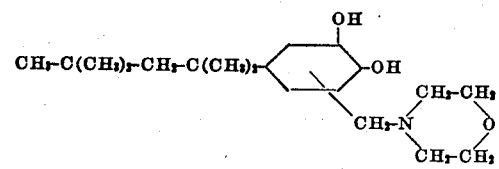

To a solution of 22.2 grams of $\alpha,\alpha,\gamma,\gamma$-tetramethylbutylpyrocatechol in 35 cc. of methanol and 8.7 grams of morpholine (0.1 mol.) there was added while cooling and stirring 10 grams aqueous 30% formaldehyde solution (0.1 mol.). After standing 24 hours, the solidified crystalline mass was filtered off and recrystallized from methanol. It formed colorless needles melting at 112°–113° C.

EXAMPLE 6

*Bis-(morpholinometho)-1,5-dihydroxy-naphthalene*

To a solution consisting of 5.4 grams of 1,5-dihydroxynaphthalene, 5.9 grams of morpholine and 20 grams of methanol there was added while stirring and cooling 6.8 grams of aqueous 30% formaldehyde solution. The clear solution rapidly solidified to a reddish, crystalline mass. The crystals were purified by recrystallization from a mixture of equal volumes of alcohol and dioxane, from which they separated in colorless, very small plates which did not melt when heated to 330° C.

EXAMPLE 7

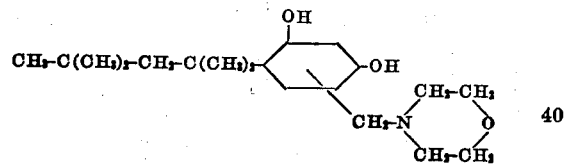

To a solution of 22.2 grams of $\alpha,\alpha,\gamma,\gamma$-tetramethylbutylresorcinol in 35 cc. of methanol and 8.7 grams of morpholine (0.1 mol.) there was added 10 grams aqueous 30% formaldehyde solution, while cooling and stirring. After standing for 18 hours the crystalline product was separated and recrystallized from methanol. It formed colorless crystals melting at 145°–146° C.

EXAMPLE 8

*Bis-(morpholinometho)-diphenylolpropane*

To a solution of 22.8 grams of diphenylolpropane (0.1 mol.) in 35 cc. of methanol there was added 17.4 grams of morpholine (0.2 mol.) and finally with shaking and cooling, dropwise, 20 grams of aqueous 30% formaldehyde solution. The clear solution obtained was allowed to stand 48 hours at the ordinary temperature. A heavy oil separated. This oil was drawn off and set aside to crystallize. The crystals were contaminated with a sticky, oily impurity which was removed by absorption on porous tile. Upon recrystallization from absolute alcohol to a constant melting point, the pure compound was obtained in colorless, pearly, fine plates melting at 154°–155° C.

The above products as well as their homologues and substitution products of the kind herein set forth possess high phenol co-efficients in the form of their water-soluble salts such as the phosphates or lactates.

I claim:
1. As a new compound, a polyhydric phenol containing as a nuclear substituent a morpholino-metho group,

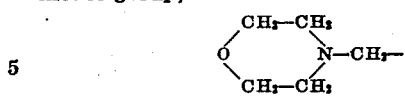

2. As a new compound, a polyhydric phenol containing a

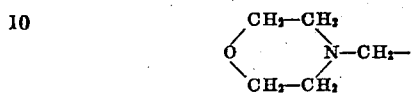

group substituted in each of two nuclear positions of its aromatic nucleus.

3. As a new compound, bis-(morpholino-metho)-pyrogallol having the probable formula:

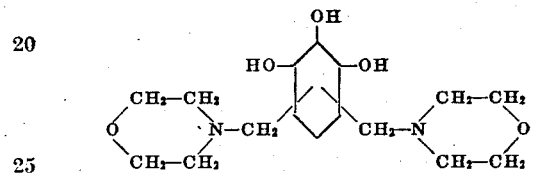

said compound forming colorless crystals melting at 174°–175° C.

4. As a new compound, bis-(morpholino-metho)-resorcinol having the probable formula:

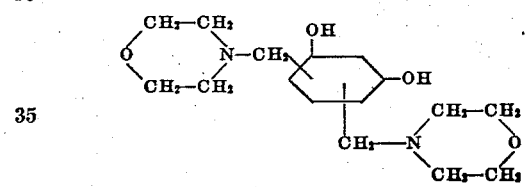

said compound forming colorless crystals which melt, when pure, at 207° C.

5. As a new compound, bis-(morpholino-metho)-hydroquinone

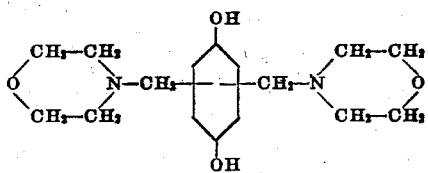

said compound forming colorless crystals which melt, when pure, at 205° C.

6. A process for preparing polyhydric phenols containing a morpholino-metho group,

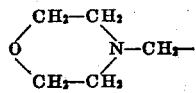

as a nuclear substituent, which comprises reacting upon a polyhydric phenol having an available replaceable nuclear hydrogen atom and which contains no free acidic group with reacting proportions of formaldehyde and morpholine.

7. A process for preparing polyhydric phenols containing two

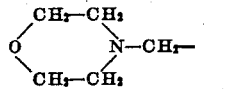

groups, which comprises reacting with two molecular equivalents each of formaldehyde and morpholine upon one molecular equivalent of a member of the group consisting of dihydroxybenzenes and trihydroxybenzenes.

HERMAN A. BRUSON.